Dec. 15, 1959   J. MUSHYNSKI   2,916,842
LICENSE PLATE HOLDERS
Filed Nov. 14, 1957   3 Sheets-Sheet 1
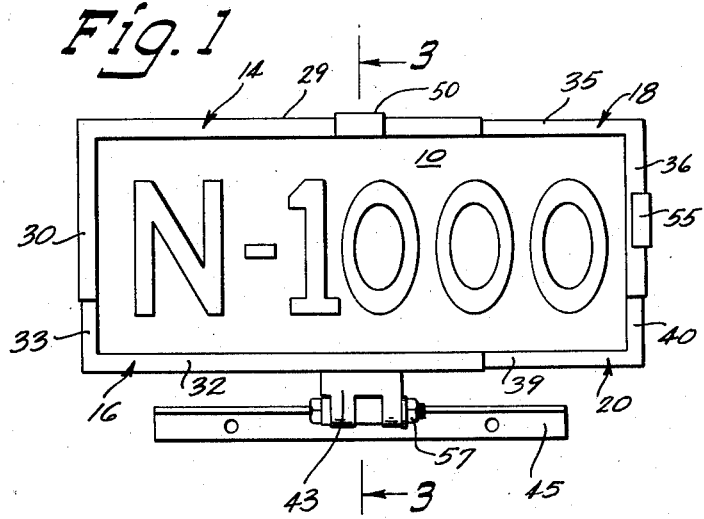
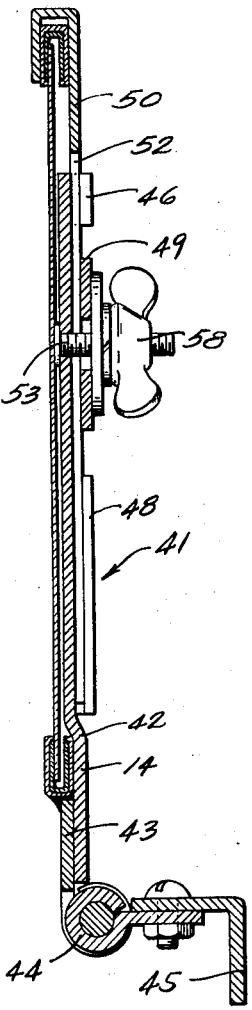
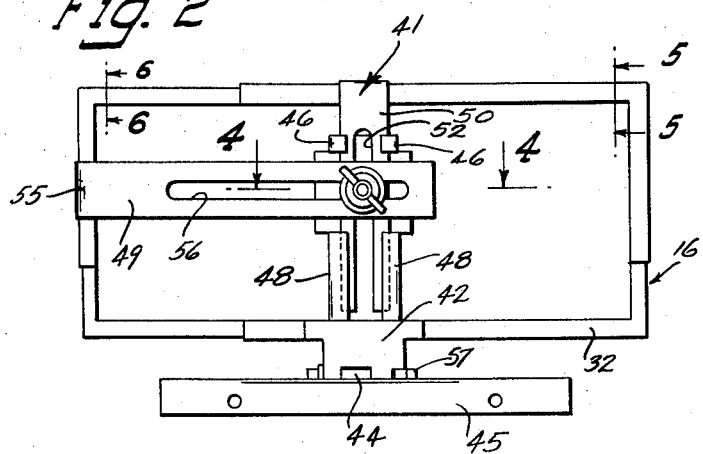
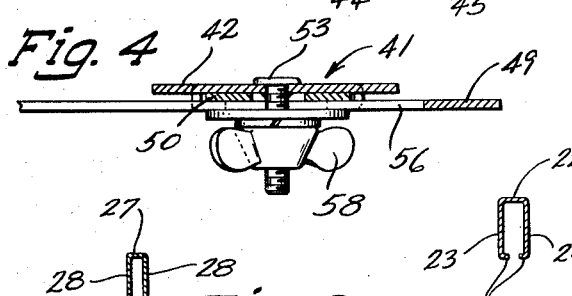
INVENTOR.
Joseph Mushynski
BY Eugene H. Simpson
Attorney

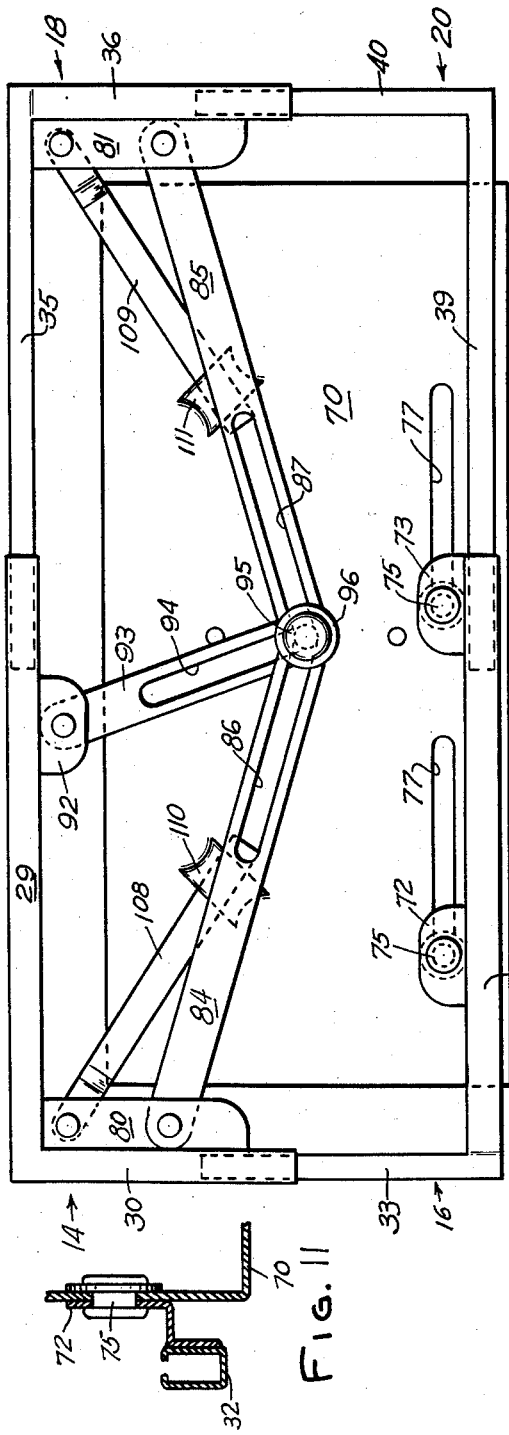
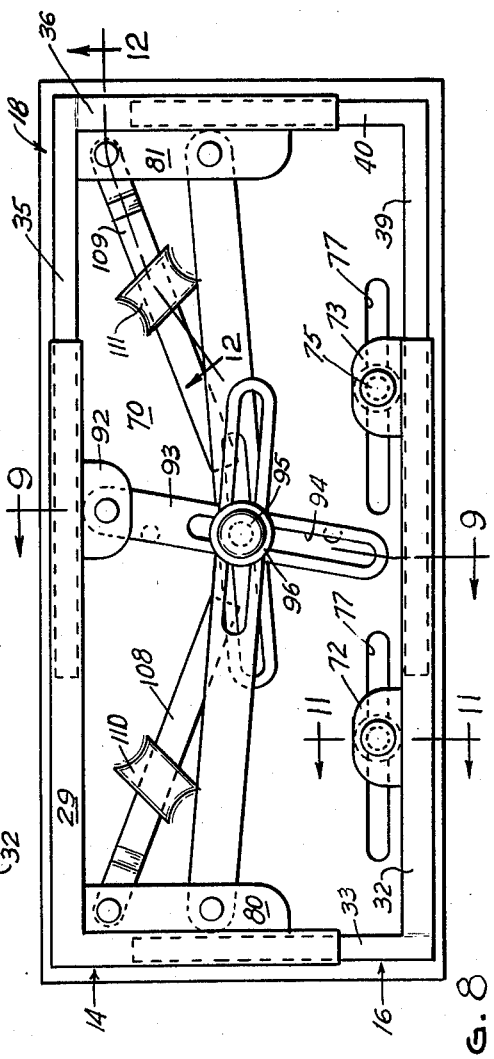

Dec. 15, 1959 J. MUSHYNSKI 2,916,842
LICENSE PLATE HOLDERS
Filed Nov. 14, 1957 3 Sheets-Sheet 3

INVENTOR.
Joseph Mushynski
BY
Eugene H. Simpson

United States Patent Office 2,916,842
Patented Dec. 15, 1959

2,916,842
LICENSE PLATE HOLDERS
Joseph Mushynski, Menominee, Mich.

Application November 14, 1957, Serial No. 696,476

3 Claims. (Cl. 40—202)

This invention relates to automotive accessories and more particularly to an adjustable license plate holder for automobiles.

It has been common practice in the past to attach an automobile license to a bracket on the automobile by two or more bolts and nuts. In such construction the edges of the license plate are unprotected and soon become bent and twisted. Attempts have been made to have the license plate mounted in a solid frame, but such frames have been of rigid construction and hence do not fit the license plates as the latter vary in size from year to year.

It is an object of the present invention to provide a license plate holder which will hold the license plate securely to the car by the use of a single nut.

Another object is to provide an adjustable license plate holder adapted to provide a rigid frame about the license plate.

Another object is to provide a license plate holder in which the license plate may be inserted without removing the nut from the binding bolt.

A further object is to provide a license plate holder which will simplify the securing of the license plate to the automobile.

A further object is to provide an adjustable license plate holder which will be simple to operate.

A still further object is to provide an adjustable license plate holder in which the angle of the license with the vertical may be varied.

A still further object of the invention is to provide an adjustable license plate holder which will not rattle under vibration.

A still further object is to prevent theft of the license plate.

A still further object is to prevent the unauthorized changing of license plates on an automobile.

Still further objects will become apparent upon considering the following specification, which, when taken in conjunction with the accompanying drawings, illustrates a preferred form of the invention.

In the drawings:

Fig. 1 is a front elevational view of a license plate holder made in accordance with the present invention and showing a license plate in place therein;

Fig. 2 is a rear view of the license plate holder shown in Fig. 1;

Fig. 3 is an enlarged cross-section on the line 3—3 of Fig. 1, looking in the direction of the arrows;

Fig. 4 is an enlarged cross-section taken on the line 4—4 of Fig. 2, looking in the direction of the arrows;

Figure 9:
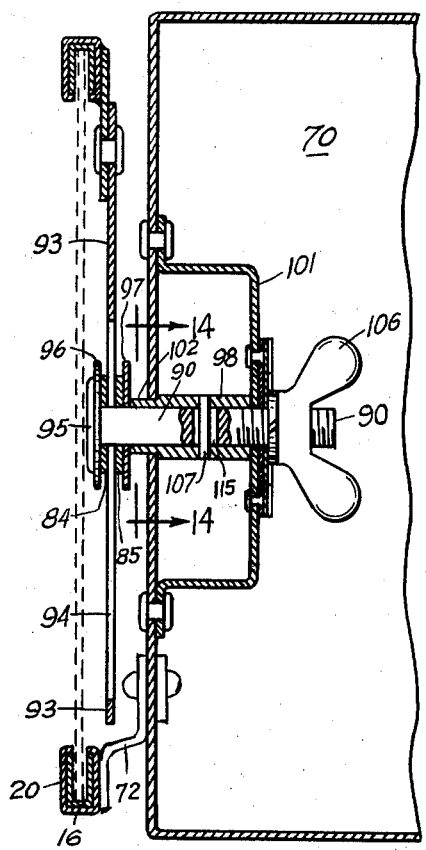
Figure 10:
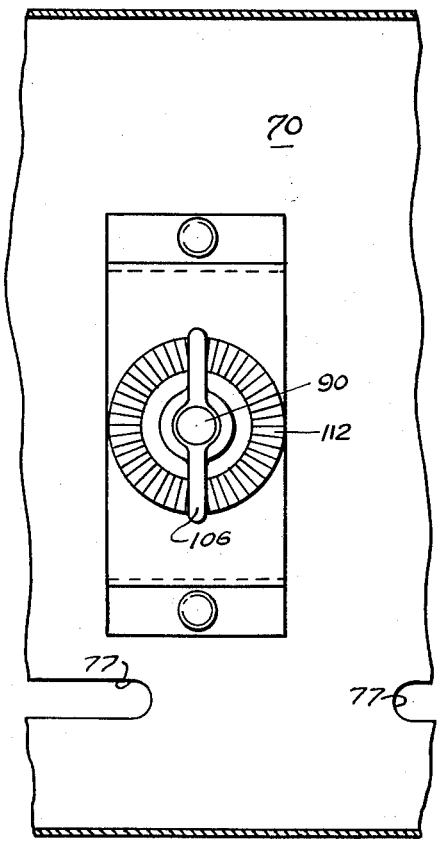
Figure 13:
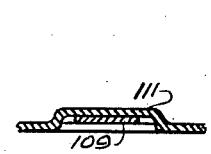
Figure 12:
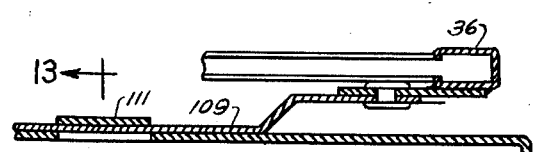
Figure 14:
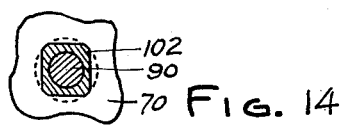

Figs. 5 and 6 are cross-sections taken on the lines 5—5 and 6—6 of Fig. 2, looking in the direction of the arrows and showing a cross-section of the channel members;

Fig. 7 is a front elevational view of a modified form of the invention with the license plate removed;

Fig. 8 is a view of the license plate holder shown in Fig. 7 showing the frame in collapsed position;

Fig. 9 is a transverse cross-section taken on the line 9—9 of Fig. 8, looking in the direction of the arrows;

Fig. 10 is a rear elevational view of the securing nut taken from within the luggage compartment;

Fig. 11 is a detailed transverse cross-section taken on line 11—11 of Fig. 8;

Fig. 12 is a transverse cross-section taken on line 12—12 of Fig. 8, looking in the direction of the arrows;

Fig. 13 is a transverse cross-section taken on line 13—13 of Fig. 12, looking in the direction of the arrows;

Fig. 14 is a transverse cross-section taken on the line 14—14 of Fig. 9; and

Figure 15:
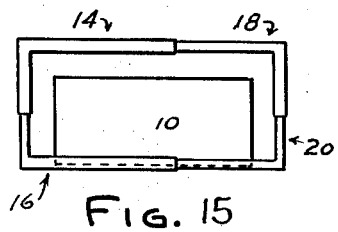
Figure 16:
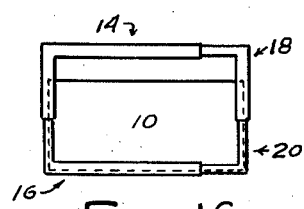
Figure 17:
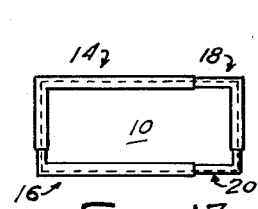

Figs. 15, 16 and 17 are elevational views showing the three steps in locking a license plate in the frame.

Referring to the drawings, the license plate 10 is carried in a rectangular frame composed of four channel-like members 14, 16, 18 and 20 interlocked with each other.

Each channel-like member 14, 16, 18 and 20 is composed of a horizontal and a vertical leg. The legs of the L-shaped members are made from one of two substantially channel-shaped sections shown in Figs. 5 and 6.

The larger section shown in Fig. 5 has an inner base 22 with parallel legs 23—24 extending outwardly from the base 22. The legs 23 and 24 have inturned outer edges as seen at 25—25. The spacing and length of the legs 23—24 is such as to receive the channel-shaped section shown in Fig. 6.

The section shown in Fig. 6 has a base 27 and outstanding legs 28—28, this section being receivable within the channel-shaped section shown in Fig. 5, and is retained therein by the inturned edges 25—25.

The frame 14 is composed of a horizontal leg 29 and a vertical leg 30, both legs being formed of the larger channel as seen in Fig. 5.

The frame 16 is composed of a horizontal leg 32 and a vertical leg 33. The vertical leg 33 is made of the smaller channel section (Fig. 6) which is received within the vertical leg 30 of the frame 14. The horizontal leg 32 is substantially the same length as the leg 29 of the member 14, and is formed of the larger channel (Fig. 5).

The member 18 is composed of a horizontal leg 35 and a vertical leg 36. The horizontal leg 35 is substantially the same length as the horizontal leg 29 of the member 14 and is formed of the smaller section (Fig. 6) and is receivable within the larger channel section of the horizontal leg 29 of the member 14. The vertical leg 36 is formed of the larger channel section (Fig. 5) and is approximately the same length as the legs 30 and 33 of the members 14 and 16.

The member 20 is comopsed of a horizontal leg 39 and a vertical leg 40. Both the legs 39 and 40 are formed of the smaller section (Fig. 6). The horizontal leg 39 is receivable within the horizontal leg 32 of the member 16 while the vertical leg 40 is receivable in the leg 36 of the member 18.

The lengths of the horizontal and vertical legs of the members 14, 16, 18 and 20 are so arranged as to permit the insertion of any ordinary size license plate 10 in the grooves between the sides of the channels.

The complete frame 14—16—18—20 is bound together to grip the license plate 10 in position by a clamp, generally designated 41 and best seen in Figs. 2 and 3.

The clamp 41 comprises a plate 42 fixed by brazing, spot welding or other suitable means to the leg 32 of the member 16 adjacent the open end of the member. The plate 42 is formed on a bracket 43 which is connected by a hinge 44 to a bracket 45. The bracket 45 is fixed to the automobile on any convenient part (not shown).

The plate 42 has bent over edges 46—46 and 48—48 adjacent the upper and lower ends thereof, the bent over edges 46—46 and 48—48 being spaced apart to provide for an end clamp 49.

The bent over edges 46—46 and 48—48 form channel guides for a plate 50. The plate 50 is welded or brazed onto the horizontal leg 29 of the member 14 and fits between the bent over edges 46—48 and 46—48 of the plate 44. The plate 50 is provided with a centrally placed longitudinal slot 52 which receives a bolt 53 held in the plate 42.

The end clamp 49 comprises a flat elongated plate with a hook 55 at the outer end engageable over the vertical leg 36 of the member 18. An elongated horizontal slot 56 passes over the bolt 53 to permit the members 42, 49 and 50 to be bound together by a wing nut 58 to hold the frame 14—16—18—20 assembled on the license plate 10.

In the form of the invention illustrated in Figs. 7 to 17, inclusive, the license plate holder is secured directly to the exterior of the luggage compartment of the automobile. Referring further to Figs. 7 to 17, inclusive, the license plate frame is identical to that shown in Figs. 1 through 6, and like parts have the same numbers. The frame comprises four sets of channel-like members 14, 16, 18 and 20 each formed in the shape of a right angle.

The member 14 is formed of two sections of the larger angle (Fig. 5) and comprises a horizontal leg 29 and a vertical leg 30. Fitting into the lower end of the larger vertical channel 30 with a sliding fit is a vertical leg 33 of the smaller channel section shown in Fig. 6.

A horizontal leg 32 formed of the larger size channel (Fig. 5) is formed on the lower end of the leg 33 to complete the member 16.

The member 18 comprises a horizontal leg 35 (Fig. 6) having a sliding fit in the larger horizontal leg 29 of the member 14 and a depending vertical leg 36, (Fig. 5) secured to the outer end of the leg 35.

The section member 20 comprises a horizontal leg 39 (Fig. 6) having a sliding fit in the leg 32 and a vertical leg 40 having a sliding fit within leg 36.

As was the case in Figs. 1 to 6 inclusive, the channel-shaped legs are adapted to interlock with each other and to form an adjustable frame for the license plate.

The frame 14—16—18—20 is secured on the luggage compartment 70 of the automobile through brackets 72—73 each of which is secured to the leg 32 (Fig. 11) by welding or other suitable means. The brackets 72—73 may be generally Z-shaped elements having the lower leg of each Z secured to the leg 32, and being provided with a circular aperture in the upper leg of each Z. The apertures receive one end of rivets 75. The opposite end of the rivets 75 extend through horizontal slots 77 in the luggage compartment with a sliding fit to permit limited movement of the frame.

A gusset plate 80 is fixed to both the channels 29 and 30 on the rear side thereof adjacent their junction, and a similar gusset plate 81 is connected to both the channels 35 and 36 on the rear side thereof adjacent their junction. Links 84 and 85 are pivotally connected to the gusset plates 80 and 81, respectively. The links 84 and 85 have slots 86 and 87, respectively, cut therethrough to be received over a central mounting bolt 90.

A plate 92 is secured to the rear side of the channel 29 and has a link 93 pivotally connected thereto. The link 93 like the links 84 and 85 is provided with a slot 94 therethrough which enables the link 93 to be received over the bolt 90.

The bolt 90 is provided with an enlarged head 95 and a pair of washers 96—97 which are spaced to confine the three links 84, 85 and 93 between them. The bolt 90 is received in a sleeve 98. The sleeve 98 is mounted inside the luggage compartment 70 of the automobile between the end wall thereof and a U-shaped bracket 101. The outer end of the sleeve 98 is provided with a square end 102 which projects through a correspondingly shaped aperture in the luggage compartment 70 and bears against the inner washer. The bolt 90 is kept from turning within the sleeve 98 by a transverse pin 107. The bolt 90 has a limited axial movement on the pin 107 by virtue of a slot 115 in the bolt. When the license plate 10 is in position in the frame a wing nut 106 may be screwed down drawing the bolt 90 inward and clamping the links 84, 85 and 93 between the washers 96 and 97.

Links 108 and 109 are pivotally connected to the gusset plates 80 and 81 and are slidably received in guides 110 and 111, respectively. The links 108 and 109, moving in the guides 110 and 111, maintain the sides of the frame in its rectangular shape as it expands or contracts.

A lock washer 112 on the screw 90 prevents accidental loosening of the wing nut 106.

Operation

In the form of the invention shown in Figs. 1 to 6, inclusive, the frame 14—16—18—20 is opened and the license plate 10 inserted in two adjacent channel members. The remaining channel members are closed on the license plate 10 so that the license plate projects into all the channel sections. The hook 55 on the end clamp 49 is then adjusted on the leg 36 and the wing nut 58 tightened to secure the license plate in place.

The nut 57 (Fig. 1) may then be loosened and the plate adjusted to the desired angle to the vertical and the nut 57 retightened to secure the plate in the desired position.

It will be noted that the single wing nut 58 holds the entire plate securely in the frame and that the nut 58 need not be removed to insert the license plate in the frame but need only be loosened to release the members 42—49—50.

In the form of the invention shown in Figs. 7 to 17, inclusive, the luggage compartment 70 is opened and the wing nut 106 loosened to allow the frame 14—16—18—20 to be expanded.

When the frame is expanded sufficiently the new license plate is inserted in the channels 32—39, and the vertical sides contracted until the sides of the license plate pass fully into the channels 30—33 and 36—40. The upper edge of the frame may then be pressed down until the channels 29—35 pass over the top edge of the license plate 10.

In this contracting movement the links 108–109 cooperate with the links 84—85 to insure substantially parallel movement of the sides.

When the edges of the license plate are fully within the channels of the frame, the nut 106 may be tightened drawing the bolt 90 against the washers 96—97 to secure the links 84—85—93 between the washer 96 and the washer 97 to prevent any further movement of the frame.

It may be noted that in order for a thief to change license plates it would be necessary for him to open the luggage compartment of the car and loosen the wing nut 106.

It will be understood that the herein described forms of the invention are to be taken merely as preferred embodiments thereof and that various changes in size, shape and arrangement of parts may be made without departing from the spirit of the invention or the scope of the subjoined claims.

That which is claimed as new and is desired to be secured by United States Letters Patent is:

1. In combination with a luggage compartment a license plate holder, comprising a plurality of telescoping channel-shaped members connected together at the corners to form a rectangular frame adapted to be varied in size to conform to various sizes of license plates, means to secure one of said telescoping members to the exterior wall of said compartment to provide limited horizontal adjustment in both size of the member and position of the member on the compartment, clamping means located centrally of said frame and passing through an opening in said wall, link members pivotally connected to each of the other said channel-shaped frame members and engageable with said clamping means, whereby in clamping position said clamping means grips the links to retain the frame in adjusted position.

2. In combination with a luggage compartment a license plate holder comprising a plurality of telescoping channel-shaped members connected together at the corners to form a rectangular frame adapted to be varied in size to conform to various sizes of license plates, means to secure one of said telescoping members to the exterior wall of said compartment to provide limited horizontal adjustment in both size of the member and position of the member on the compartment, links pivotally connected to each of the other said telescopic channel-shaped members, said links being slotted adjacent one end with the links overlapping adjacent the central portion of the frame, a bolt passing through the slot in each of the links and through the wall of the luggage compartment and a nut on the bolt within said luggage compartment engageable on said bolt to clamp the links together and retain the frame in adjusted position.

3. In combination with a luggage compartment a license plate holder comprising a plurality of telescoping channel-shaped members connected together at the corners to form a rectangular frame adapted to be varied in size to conform to various sizes of license plates, means to secure one of said telescoping members to the exterior wall of said compartment to provide limited horizontal adjustment in both size of the members and position of the member on the compartment, links pivotally connected to each of the other said telescopic channel-shaped members, said links being slotted adjacent the central portion of the frame, a yoke secured to the interior of the compartment, a post mounted within the yoke and projecting through an aperture in the luggage compartment, a bolt passing through the slot in each of said links and through a longitudinal aperture in the post into said compartment, and a nut engageable on said bolt and adapted to clamp the links between the head of the bolt and the port to clamp the frame in adjusted position.

References Cited in the file of this patent

UNITED STATES PATENTS

| | | |
|---|---|---|
| 959,735 | Hancock | May 31, 1910 |
| 1,757,587 | Quinn | May 6, 1930 |
| 2,098,156 | Nielsen | Nov. 2, 1937 |
| 2,292,999 | Heren | Aug. 11, 1942 |
| 2,349,703 | Carlin | May 23, 1948 |
| 2,454,722 | Slamka | Nov. 23, 1948 |
| 2,763,077 | Neely | Sept. 18, 1956 |